US009236159B2

(12) United States Patent
Yonemaru et al.

(10) Patent No.: US 9,236,159 B2
(45) Date of Patent: Jan. 12, 2016

(54) POLYETHER RUBBER, RUBBER COMPOSITION, CROSS-LINKED RUBBER, AND CONDUCTIVE MEMBER

(75) Inventors: Hiroyuki Yonemaru, Tokyo (JP); Shigetaka Hayano, Tokyo (JP)

(73) Assignee: ZEON CORPORATION, Tokyo (JP)

(*) Notice: Subject to any disclaimer, the term of this patent is extended or adjusted under 35 U.S.C. 154(b) by 525 days.

(21) Appl. No.: 13/519,835

(22) PCT Filed: Dec. 27, 2010

(86) PCT No.: PCT/JP2010/073605
§ 371 (c)(1),
(2), (4) Date: Jun. 28, 2012

(87) PCT Pub. No.: WO2011/081152
PCT Pub. Date: Jul. 7, 2011

(65) Prior Publication Data
US 2012/0296049 A1 Nov. 22, 2012

(30) Foreign Application Priority Data

Dec. 29, 2009 (JP) ................................. 2009-299221
May 31, 2010 (JP) ................................. 2010-124285

(51) Int. Cl.
*C08G 59/14* (2006.01)
*C08F 283/00* (2006.01)
*H01B 1/12* (2006.01)
*C08G 65/333* (2006.01)
*C08L 71/03* (2006.01)
*C08G 65/14* (2006.01)
*C08G 65/24* (2006.01)

(52) U.S. Cl.
CPC ................ *H01B 1/125* (2013.01); *C08G 65/14* (2013.01); *C08G 65/24* (2013.01); *C08G 65/333* (2013.01); *C08G 65/33303* (2013.01); *C08L 71/03* (2013.01)

(58) Field of Classification Search
CPC ..................................................... C08G 65/333
USPC .................................................. 525/403, 540
See application file for complete search history.

(56) References Cited

U.S. PATENT DOCUMENTS

| 3,320,317 | A  | * | 5/1967 | Rogers et al. ................. 564/294 |
| 3,428,680 | A  | * | 2/1969 | Walker et al. ................. 564/294 |
| 4,282,118 | A  |   | 8/1981 | Hwang |
| 6,400,919 | B1 |   | 6/2002 | Inoue et al. |
| 2002/0064511 | A1 |   | 5/2002 | Simon et al. |
| 2004/0170600 | A1 |   | 9/2004 | Simon et al. |
| 2006/0047054 | A1 | * | 3/2006 | Wang et al. ................... 524/495 |

FOREIGN PATENT DOCUMENTS

| CN | 1655288 A | 8/2005 |
| JP | 55-66944 A | 5/1980 |
| JP | 2001-503457 A | 3/2001 |
| JP | 2001-166563 A | 6/2001 |
| JP | 2004-35868 A | 2/2004 |
| JP | 2005-225969 A | 8/2005 |
| JP | 2007-161888 A | 6/2007 |

OTHER PUBLICATIONS

Chinese Office Action mailed Aug. 5, 2013 in corresponding Chinese Patent Application No. 201080060076.3.
Chinese Search Report issued in corresponding Chinese Patent Appliaction No. 201080060076.3 (English translation is provided), dated Jul. 25, 2013.
International Search Report issued in PCT/JP2010/073605, mailed on Apr. 12, 2011.

* cited by examiner

*Primary Examiner* — David Karst
(74) *Attorney, Agent, or Firm* — Birch, Stewart, Kolasch & Birch, LLP

(57) ABSTRACT

Provided is a polyether rubber that contains a specific proportion of a specific unit containing an onium ion. According to the present invention, a conductive member and a cross-linked rubber that constitutes part of the conductive member can be provided, in which the conductive member has low electrical resistance value and little variation in electrical resistance, and suppressed increases in the electrical resistance value even if used continuously.

4 Claims, No Drawings

POLYETHER RUBBER, RUBBER COMPOSITION, CROSS-LINKED RUBBER, AND CONDUCTIVE MEMBER

TECHNICAL FIELD

The present invention relates to polyether rubber. In particular, it relates to onium-containing polyether rubber having an onium ion-containing group. The present invention further relates to a rubber composition containing the polyether rubber, a cross-linked rubber, and a conductive member containing the cross-linked rubber.

BACKGROUND ART

In a device of an image forming apparatus such as a printer, an electrophotographic copying machine, or a facsimile machine which is believed to require semi-conductivity, a conductive member such as a conductive roll, a conductive blade, or a conductive belt is used.

Depending on specific use, various properties including conductivity within a desired range (electrical resistance value and its variation, dependence on environment, and dependence on voltage), non-contaminating property, low hardness, and dimension stability are required for the conductive member.

As a way of providing conductivity to rubber for constituting part of a conductive member, a method of adding a small amount of a conductivity imparting material such as carbon black or metal oxide to rubber and dispersing it therein to control the electrical resistance of a conductive member is known. However, according to this method, it is difficult to control the dispersity of a small amount of the conductivity imparting material added by kneading and, since the dispersion state of the conductivity imparting material is changed according to flow of rubber during molding and cross-linking, causing a variation in electrical resistance value, and therefore there is a problem that a sharp image is difficult to be obtained.

Therefore, as a solution for the variation in electrical resistance value, polyether rubber or the like having semi-conductivity by itself without being added with a conductivity imparting material has been used as a conductive member. However, in recent days, high speed is required for an image forming apparatus, and the conductive member, in particular a conductive roll, requires to have even lower electrical resistance. As a method of lowering electrical resistance, increasing the unit amount of an ethylene oxide monomer as one of the constituent units of polyether rubber is effective. However, when the unit amount of an ethylene oxide monomer is increased, the rubber itself becomes water soluble, and therefore it may be difficult to produce it. Further, there is also a problem that it causes contamination of a photoconductor. Therefore, according to conventional methods, the unit amount of an ethylene oxide monomer in polyether rubber can be increased only to a certain level, and as a result, requirements for having low electrical resistance may not be fully satisfied.

Further, there has been conventionally a problem that, under application of voltage to a conductive member, continuous use of a conductive member leads to its deterioration caused by electric current so that electrical resistance value of the conductive member increases and quality of an image is impaired accordingly. For solving the problem, it is disclosed in Patent Document 1 that, by using a specific conductive material, the static friction coefficient on surface of a conductive member is kept at a specific value so that a variation in resistance in accordance with continuous use of a conductive member can be suppressed. However, it is insufficient in terms of having low electrical resistance that is recently required for a conductive member and satisfying a property of suppressing a variation in resistance during continuous use without adding a conductivity imparting material (conductive material).

PRIOR ART DOCUMENTS

Patent Documents

Patent Document 1: Japanese Patent Publication (A) No. 2001-166563

DISCLOSURE OF THE INVENTION

Problem to be Solved by the Invention

Object of the present invention is to provide a conductive member which has low electrical resistance value and little variation in electrical resistance value, and even if used continuously, an increase in the electrical resistance value is suppressed, a cross-linked rubber for constituting part of the conductive member, and a rubber composition containing polyether rubber for constituting the cross-linked rubber. Also provided by the present invention is polyether rubber for constituting the rubber composition.

Means for Solving the Problems

To solve the problems described above, inventors of the present invention conducted intensive studies, and as a result, found that the object described above is achieved by polyether rubber that contains a specific proportion of a specific unit that contains an onium ion, and completed the present invention accordingly.

According to the present invention, there is provided a polyether rubber containing the unit represented by the formula (1) in an amount of 0.1 mol % or more but less than 30 mol %.

[Chemical Formula 1]

(1)

(in the formula, —$Y^+R_n$ represents an onium ion, R represents a hydrocarbon group which may have a substituent group or hydrogen, $X^-$ represents arbitrary counter anion, and n represents an integer of 1 to 3).

In the formula (1), it is preferable that —$Y^+R_n$ is an ammonium ion and n is 3. Further, it is more preferable that R is an alkyl group having 1 to 18 carbon atoms. It is furthermore preferable that —$Y^+R_n$ is —$N^+(n-C_4H_9)(CH_3)_2$ or —$N^+(CH_3)_3$.

Further, it is preferably polyether rubber described in any one of the above in which a cross-linkable monomer unit is included. Further, as a cross-linkable monomer unit, an epihalohydrin monomer unit and/or an unsaturated oxide monomer unit are preferable.

Further, according to the present invention, there is provided a rubber composition containing the polyether rubber described in any one of the above and a cross-linking agent.

Further, according to the present invention, there is provided a cross-linked rubber that is obtained by molding and cross-linking the rubber composition containing a cross-linking agent.

Still further, according to the present invention, there is provided a conductive member containing the cross-linked rubber.

Effects of the Invention

According to the present invention, a conductive member which has low electrical resistance value and little variation in electrical resistance even without being added with a conductivity imparting material (conductive material) and has suppressed increase in the electrical resistance value even if used continuously is provided. Also provided are a cross-linked rubber for constituting part of the conductive member, and a rubber composition containing polyether rubber for constituting the cross-linked rubber. Further, polyether rubber for constituting the rubber composition is also provided.

DESCRIPTION OF EMBODIMENTS

Polyether Rubber

The polyether rubber of the present invention contains a unit represented by the formula (1) in an amount of 0.1 mol % or more but less than 30 mol %.

[Chemical Formula 2]

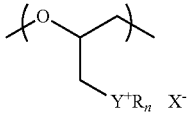

(1)

(in the formula, —Y$^+$R$_n$ represents an onium ion, R represents a hydrocarbon group which may have a substituent group or hydrogen, X$^-$ represents arbitrary counter anion, and n represents an integer of 1 to 3).

The unit represented by the formula (1) is generally obtained by substituting at least part of halogen atoms which constitute an epihalohydrin monomer unit with an onium ion-containing group.

As the epihalohydrin monomer which constitutes an epihalohydrin monomer unit, although not specifically limited, for example, epichlorohydrin, epibromohydrin, epiiodohydrin, and epifluorohydrin etc. may be mentioned. Of these, epichlorohydrin is preferable. The epihalohydrin monomer may be used in combination of two or more. The content ratio of an epihalohydrin monomer unit which remains after substitution of at least part of halogen atoms with an onium ion-containing group in the polyether rubber of the present invention is preferably 99.9 to 0 mol %, more preferably 78.5 to 10 mol %, and furthermore preferably, 57.3 to 15 mol % in the entire monomer units. When the content ratio of the epihalohydrin monomer unit in polyether rubber falls within the above range, it is possible to obtain polyether rubber with suppressed increase in volume resistivity value caused by electric current. Meanwhile, when the content ratio of the epihalohydrin monomer unit is excessively high, the volume resistivity value may increase.

According to the present invention, at least part of the halogen atoms which constitute an epihalohydrin monomer unit are preferably substituted with an onium ion-containing group. As the onium ion, although not specifically limited, for example, an ammonium ion, a phosphonium ion, and a sulfonium ion etc. may be mentioned. Of these, from the view point of easiness in production, an ammonium ion and a phosphonium ion are preferable. From the view point of stability of a material after the reaction, an ammonium ion is more preferable. The onium ion for the substitution may be used in combination of two or more.

As an ammonium ion for the substitution, any one of primary, secondary, tertiary, and quaternary ammonium can be used. However, from the view point of easiness in production, tertiary and quaternary ammonium ions are preferable. From the view point of stability of a material after the reaction, a quaternary ammonium ion is more preferable. As a phosphonium ion for the substitution, a quaternary phosphonium ion is preferable from the view point of stability of a material after the reaction. As a sulfonium ion for the substitution, a tertiary sulfonium ion is preferable from the view point of stability of a material after the reaction.

A unit in which at least part of the halogen atoms which constitute an epihalohydrin monomer unit are substituted with an onium ion-containing group can be represented by the following formula (1).

[Chemical Formula 3]

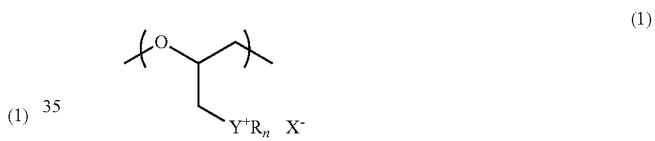

(1)

(in the formula, —Y$^+$R$_n$ represents an onium ion, R represents a hydrocarbon group which may have a substituent group or hydrogen, X$^-$ represents arbitrary counter anion, and n represents an integer of 1 to 3. When n is 2 or more, R may be bonded to each other to form an aliphatic ring containing a hetero atom. The value of n varies depending on type of the onium ion, and when —Y$^+$R$_n$ is an ammonium ion or a phosphonium ion, for example, it is 3. When —Y$^+$R$_n$ is a sulfonium ion, it is 2. Thus, based on that Y represents an atom to be changed to onium, when —Y$^+$R$_n$ is an ammonium ion, it may be represented by —N$^+$R$_3$. When —Y$^+$R$_n$ is a phosphonium ion, it may be represented by —N$^+$R$_3$. When —Y$^+$R$_n$ is a sulfonium ion, it may be represented by —S$^+$R$_2$).

As the substituent group for the hydrocarbon group, although not specifically limited, for example, a hydroxy group, an amino group, an amide group, a nitro group, a cyano group, a carboxyl group, an alkoxyl group, an ester group, a sulfone group, an aryl group, a mercapto group, and an alkylthio group etc. may be mentioned.

The method of substituting at least part of the halogen atoms which constitute an epihalohydrin monomer unit with an onium ion-containing group is an application of a known onium-forming reaction, and the known onium-forming reaction is disclosed in Japanese Patent Publication (A) No. 50-33271, Japanese Patent Publication (A) No. 51-69434, and Japanese Patent Publication (A) No. 52-42481.

The compound used for substituting at least part of the halogen atoms which constitute an epihalohydrin monomer unit with an onium ion-containing group (herein below, referred to as an "onium-forming agent") is broadly selected depending on the type of onium ions for the substitution.

As the onium-forming agent that is used for substituting at least part of the halogen atoms which constitute an epihalohydrin monomer unit with an ammonium ion-containing group, amines may be mentioned. As amines, any one of primary amines, secondary amines, and tertiary amines may be used. Further, any amines of aliphatic amines and aromatic amines may be used.

A group contained in the amines (that is, a group for constituting R in the formula (1)) is not specifically limited, but for example, a hydrogen atom; and a hydrocarbon group such as an alkyl group having 1 to 30 carbon atoms like a methyl group, an ethyl group, a butyl group, an octyl group, or a lauryl group; a cycloalkyl group like a cyclohexyl group; an alkenyl group like a vinyl group; an aryl group like a phenyl group or a naphthyl group; an aryl alkyl group like a benzyl group; and an alkyl aryl group like a dodecyl phenyl group; may be mentioned. Further, a hydrocarbon group to which a substituent group is introduced such as an alkanol group like an ethyl alkanol group; and an alkoxy alkyl group like a methoxy ethyl group; may be mentioned. Of these, an alkyl group having 1 to 30 carbon atoms and an alkoxy alkyl group having 1 to 30 carbon atoms are preferable. An alkyl group having 1 to 30 carbon atoms is more preferable. Among the alkyl groups having 1 to 30 carbon atoms, an alkyl group having 1 to 18 carbon atoms is preferable from the view point of reactivity between the amines and the halogen atoms which constitute the epihalohydrin monomer unit. Further, the groups contained in the amines may be bonded to each other to form an aliphatic ring containing a nitrogen atom.

The group contained in the amines may have a substituent group, and as the substituent group, although not specifically limited, for example, a hydroxy group, an amino group, an amide group, a nitro group, a cyano group, a carboxyl group, an alkoxyl group, an ester group, a sulfone group, an aryl group, a mercapto group, and an alkylthio group etc. may be mentioned.

As the specific examples of the amines, methylamine, butylamine, cyclohexyl amine, aniline, benzylamine, ethanolamine, dimethyl amine, diethyl amine, dibutyl amine, nonylphenylamine, piperidine, trimethylamine, n-butyl dimethylamine, n-octyl dimethylamine, n-stearyl dimethylamine, tributylamine, trivinylamine, N,N'-dimethyl aniline, triethanolamine, N,N'-dimethyl ethanolamine, and tri(2-ethoxyethyl)amine etc. may be mentioned. Of these, secondary amines and tertiary amines which can easily yield a tertiary ammonium ion and a quaternary ammonium ion are preferable. Specifically, diethylamine, dibutylamine, piperidine, trimethylamine, n-butyl dimethylamine, n-octyl dimethylamine, n-stearyl dimethylamine, N,N'-dimethyl aniline, and N,N'-dimethyl ethanolamine are more preferable. Further, of these, the tertiary amines which can easily yield a quaternary ammonium ion are preferable. Specifically, trimethylamine, n-butyl dimethylamine, n-octyl dimethylamine, n-stearyl dimethylamine, N,N'-dimethyl aniline, and N,N'-dimethyl ethanolamine are more preferable.

As the onium-forming agent that is used for substituting at least part of the halogen atoms which constitute an epihalohydrin monomer unit with a phosphonium ion-containing group, a phosphorus-containing compound may be mentioned. As the specific examples of the phosphorus-containing compound, trimethyl phosphine, dimethyl-n-butyl phosphine, phenyl dimethyl phosphine, cyclohexyl dimethyl phosphine, triethyl phosphine, tri-n-butyl phosphine, tricyclohexylphosphine, triphenylphosphine, and trihydroxyethylphosphine may be mentioned.

As the onium-forming agent that is used for substituting at least part of the halogen atoms which constitute an epihalohydrin monomer unit with a sulfonium ion-containing group, a sulfur-containing compound may be mentioned. As the specific examples of the sulfur-containing compound, dimethyl sulfide, dihexyl sulfide, diphenyl sulfide, ethyl methylthiopropionate, dioctyl thiodipropionate, (2-carboxyethyl) methyl sulfide, tetrahydrothiophene, and methylbenzyl sulfide etc. may be mentioned.

As for the method for substituting at least part of the halogen atoms which constitute an epihalohydrin monomer unit with an onium ion-containing group, any known onium-forming reaction may be used, but it varies depending on type of the onium ion.

As for the method of substituting at least part of the halogen atoms which constitute an epihalohydrin monomer unit in polyether rubber with an onium ion-containing group, substitution can be carried out by mixing the onium-forming agent and the polyether rubber containing an epihalohydrin monomer unit and reacting the same. The method of mixing the onium-forming agent and polyether rubber is not specifically limited, for example, a method of adding an onium-forming agent to a solution containing polyether rubber followed by mixing, a method of adding polyether rubber to a solution containing the onium-forming agent followed by mixing, and a method of preparing a solution of the onium-forming agent and a solution of polyether rubber followed by mixing the two solutions etc. may be mentioned. In this regard, the onium-forming agent may be dissolved in a solvent in which polyether rubber is dispersed, polyether rubber may be added to a solution in which the onium-forming agent is dissolved followed by dispersing, an onium-forming agent may be dispersed in a solution in which polyether rubber is dissolved, or polyether rubber may be dissolved in a solution in which the onium-forming agent is dispersed. Thus, dissolution or dispersion of the onium-forming agent or polyether rubber in a solution is not an issue. Further, the onium-forming agent and polyether rubber may be mixed with each other without intervention of a solvent, and they may be mixed with each other without intervention of a solvent followed by mixing with a solvent. Among them, from the view point of good control of the reaction and efficient isolation and recovery of a product to be obtained, it is preferable to carry out the reaction in solution. Further, a method of adding an onium-forming agent to a solution in which polyether rubber is dissolved followed by mixing or a method of preparing a solution of the onium-forming agent and a solution of polyether rubber followed by mixing the two solutions is more preferable.

As a solvent, an inert solvent is appropriately used, and it may be either non-polar or polar. As the non-polar solvent, for example, aromatic hydrocarbons such as benzene or toluene; saturated linear hydrocarbons such as n-pentane or n-hexane; and alicyclic saturated hydrocarbons such as cyclopentane or cyclohexane etc. may be mentioned. As the polar solvent, for example, ethers such as tetrahydrofuran, anisole, or diethyl ether; esters such as ethyl acetate or ethyl benzoate; ketones such as acetone, 2-butanone, or acetophenone; aprotic polar solvents such as acetonitrile, dimethyl formamide, or dimethyl sulfoxide; and protic polar solvents such as ethanol, methanol, or water; etc. may be mentioned. A mixture solvent thereof may be also suitably used as a solvent. Of these solvents described above, from the view point of solubility of polyether rubber and controlling reaction rate, a mixture solvent of a non-polar solvent and a polar solvent is suitably used. However, the type and composition of the solvent to be used may be determined according to the structure of polyether rubber. In general, when polyether rubber has low polarity, it is preferable to use a mixture solvent containing a non-polar solvent at higher ratio, depending on the polarity of the polyether rubber. Further, from the view point of increasing reaction rate, a mixture solvent in which a polar solvent is mixed in an amount of 0.1 wt % or more, in particular 0.5 wt % or more per the non-polar solvent is preferable. Further, the upper limit of the polar solvent is preferably 30 wt %. The use amount of the solvent is not specifically limited. Preferably, it is used to have 1 to 50 wt % of the polyether rubber concentration, and more preferably 3 to 40 wt. % concentration.

Use amount of the onium-forming agent is not specifically limited, and it is preferably determined depending on the onium-forming agent that is used or structure of the polyether rubber or desired substitution ratio of an onium ion-containing group in polyether rubber. Specifically, the use amount of the onium-forming agent is, with respect to 1 mol of halogen atoms which constitute an epihalohydrin monomer unit, generally in the range of 0.01 to 100 mol, preferably 0.02 to 50 mol, and more preferably 0.03 to 10 mol. When the amount of the onium-forming agent is excessively low, substitution reaction may be slowed down and the onium-containing polyether rubber having desired composition may not be obtained. On the other hand, when the amount of the onium-forming agent is excessively high, removal of the onium-forming agent from onium-containing polyether rubber obtained may become difficult.

Pressure for the onium-forming reaction is generally 0.1 to 50 MPa, preferably 0.1 to 10 MPa, and more preferably 0.1 to 5 MPa. Further, 0.1 MPa as used herein indicates that the reaction is carried out at pressure close to atmospheric pressure. The reaction temperature is generally 0° C. to 200° C., preferably 20° C. to 170° C., and more preferably 40° C. to 150° C. When the reaction temperature is low, the reaction progresses slowly. On the other hand, when the reaction temperature is high, a side reaction may occur. The reaction time is generally 1 minute to 1,000 hours, preferably 3 minutes to 800 hours, more preferably 5 minutes to 500 hours, furthermore preferably 5 minutes to 200 hours, and particularly preferably 30 minutes to 200 hours.

When no solvent is used for the onium-forming reaction, the onium-forming agent and polyether rubber are homogeneously mixed and heated in a dry type kneader such as a biaxial kneader for carrying out the reaction and unreacted onium-forming agent or volatile products are removed by volatilization or washing either after or in the middle of the reaction, if necessary. Kneading time for mixing polyether rubber and the onium-forming agent in a biaxial kneader or the like is not specifically limited, and it may be the time required for homogeneous dissolving or dispersing of polyether rubber and the onium-forming agent. It is generally 1 minute to 10 days, preferably 5 minutes to 5 days, more preferably 5 minutes to 1 day, and furthermore preferably 5 minutes to 5 hours. When the kneading time is too short, solubility or dispersity is impaired. On the other hand, when it is too long, polyether rubber may be decomposed due to the stress occurred during kneading. Further, the mixing temperature is generally 0° C. to 200° C., preferably 20° C. to 180° C., and more preferably 40° C. to 160° C. When the mixing temperature is excessively low, there is a tendency that the kneading of polyether rubber is difficult, thus slowing down the mixing with an onium-forming agent. On the other hand, when the mixing temperature is too high, the mixing of polyether rubber with an onium-forming agent may be fast but the onium-forming reaction may progress in a heterogeneous state and decomposition of polyether rubber or volatilization of the onium-forming agent may occur.

The method for substituting at least part of the halogen atoms which constitute an epihalohydrin monomer unit with an ammonium ion-containing group can be carried out with reference to the method described above. In particular, when substitution to a quaternary ammonium ion-containing group is carried out by using tertiary amines, the tertiary amines and polyether rubber containing an epihalohydrin monomer unit are generally mixed with each other to perform substitution reaction in one step. The reaction may be carried out by mixing only the tertiary amines and polyether rubber containing an epihalohydrin monomer unit, or other compound such as an organic solvent may be included. However, the reaction is preferably carried out in an organic solvent. The organic solvent may be used singly. However, from the view point of solubility of polyether rubber substituted with ammonium and control of reaction rate of quaternary ammonium-forming reaction, a mixture solvent containing a non-polar solvent and a polar solvent is particularly suitably used. As a mixture solvent, from the view point of polymerization solvent used for producing polyether rubber containing an epihalohydrin monomer unit, toluene is preferably contained. From the view point of increasing rate for a quaternary ammonium ionization reaction and solubility of polyether rubber substituted with ammonium, it is more preferable that other polar solvent is mixed with toluene. As the examples of the mixture solvent, toluene/acetonitrile, toluene/ethanol, toluene/methanol, and toluene/water etc. may be mentioned. The mixing ratio is not specifically limited. However, when the polyether rubber has low polarity, it is preferable to use a mixture solvent in which toluene is contained at high ratio, depending on the polarity of the polyether rubber. Further, from the view point of improving reaction rate, a mixture solvent in which the polar solvent is contained in an amount of 0.1 wt % or more, and particularly 0.5 wt % or more and 30 wt % or less with respect to toluene is preferably used. The mixture solvent may be either a homogenous mixture or a dispersion in which a non-polar solvent and a polar solvent may be dispersed without compatibility to each other. As for the mixture solvent, a mixture solvent having the constant composition may be used from the beginning of the reaction, or the solvent composition may be varied by adding any one solvent during the reaction. The use amount of the solvent is not specifically limited. However, it is preferably used such that concentration of ammonium-substituted polyether rubber is 1 to 50 wt %, and more preferably 3 to 40 wt %.

Condition for carrying out the substitution with a quaternary ammonium ion-containing group by using tertiary amines is not specifically limited, and it may be determined depending on tertiary amines that are used or structure of polyether rubber and desired substitution ratio of a quaternary ammonium ion or the like. The use amount of the tertiary amines is not specifically limited, and it may be determined depending on type of tertiary amines that are used or structure of polyether rubber and desired substitution ratio with a quaternary ammonium ion-containing group in polyether rubber or the like. Specifically, the use amount of the tertiary amines is generally in the range of 0.01 to 100 mol, preferably 0.02 to 50 mol, and more preferably 0.03 to 10 mol with respect to 1 mol of the halogen atoms which constitute an epihalohydrin monomer unit used. When the amount of the tertiary amines is excessively small, the substitution reaction is slowed down so that onium-containing polyether rubber with desired composition may not be obtained. On the other hand, when the amount of the tertiary amines is excessively high, removal of the tertiary amines from onium-containing polyether rubber obtained may become difficult to achieve.

Reaction pressure, reaction temperature, and reaction time are the same as those conditions that are generally described above for the onium-forming agent.

When substitution to a tertiary ammonium ion-containing group is carried out by using secondary amines, the secondary amines and polyether rubber containing an epihalohydrin monomer unit are generally mixed with each other to perform substitution reaction in one step. As the reaction condition for performing the substitution, it may be performed according to the substitution reaction between the tertiary amines and polyether rubber containing an epihalohydrin monomer unit as described above. The use amount of the secondary amines is not specifically limited, and it is generally in the range of 0.01 to 2 mol, preferably 0.02 to 1.5 mol, and more preferably 0.03 to 1 mol with respect to 1 mol of the halogen atoms which constitute an epihalohydrin monomer unit. When the amount of the secondary amines is excessively small, the substitution reaction is slowed down so that onium-containing polyether rubber with desired composition may not be obtained. On the other hand, when the amount of the secondary amines is excessively high, unreacted secondary amines that are present in an excess amount compared to the halogen atoms promote the elimination of hydrogen chloride from tertiary ammonium to induce conversion of an ammonium ion in the polyether rubber into an amine. As a result, control of desired substitution ratio of an onium ion-containing group contained in polyether rubber may become difficult to achieve.

Further, by using secondary amines, substitution with a quaternary ammonium ion-containing group can be attained. As described above, the secondary amines and polyether rubber containing an epihalohydrin monomer unit are mixed with each other to substitute the halogen atoms with a tertiary ammonium ion. Subsequently, a base is added to release a proton from the tertiary ammonium ion so that the substituent group is converted into a tertiary amino group. Further, by mixing and adding an alkyl halide, for example, a quaternary ammonium ion-containing group can be introduced. Any of those reactions can be carried out with reference to the reaction condition described above for an onium ion substitution reaction.

The method for substituting at least part of the halogen atoms which constitute an epihalohydrin monomer unit with a phosphonium ion-containing group may be carried out with reference to the reaction condition described above for an onium ion substitution reaction.

The method for substituting at least part of the halogen atoms which constitute an epihalohydrin monomer unit with a sulfonium ion-containing group may be carried out with reference to the reaction condition described above for an onium ion substitution reaction.

As used herein, arbitrary counter anion represented by $X^-$ in the formula (1) above indicates a compound or an atom having a negative charge, which is bonded to an onium ion via an ionic bond. Except that it has a negative charge, it is not specifically limited. The counter anion is bonded via a dissociable ionic bond, and therefore can be exchanged with any other counter anion according to a known ion exchange reaction. The onium-forming agent and polyether rubber containing an epihalohydrin monomer unit are mixed with each other for substituting at least part of the halogen atoms which constitute an epihalohydrin monomer unit in polyether rubber with an onium ion-containing group, $X^-$ in the formula (1) is a halide ion at the time of the completion of the onium-forming reaction. However, a known anion exchange reaction may be carried out for the halide ion as a counter anion of an onium ion of polyether rubber containing an onium ion-containing group obtained. The anion exchange reaction may be carried out by mixing an ionic compound having a dissociating property with polyether rubber containing an onium ion-containing group. The condition for performing an anion exchange reaction is not specifically limited. It may be determined depending on an ionic compound that is used and structure of polyether rubber and desired substitution ratio of an onium ion with a counter anion, or the like. The reaction may be carried out by mixing only an ionic compound and polyether rubber containing an onium ion-containing group, or other compound such as an organic solvent may be included. The use amount of the ionic compound is not specifically limited. However, with respect to 1 mol of the halogen atoms which constitute an epihalohydrin monomer unit used, it is generally in the range of 0.01 to 100 mol, preferably 0.02 to 50 mol, and more preferably 0.03 to 10 mol. When the amount of the ionic compound is too small, the substitution reaction may not easily occur. On the other hand, when it is too large, removal of the ionic compound may become difficult to achieve.

Pressure for the anion exchange reaction is generally 0.1 to 50 MPa, preferably 0.1 to 10 MPa, and more preferably 0.1 to 5 MPa. The reaction temperature is generally −30° C. to 200° C., preferably −15° C. to 180° C., and more preferably 0° C. to 150° C. The reaction time is generally 1 minute to 1000 hours, preferably 3 minutes to 100 hours, more preferably 5 minutes to 10 hours, and particularly preferably 5 minutes to 3 hours.

Type of the counter anion is not specifically limited, halide ions such as fluoride ions, chloride ions, bromide ions, or iodide ions; sulfate ions; sulfite ions; hydroxide ions; carbonate ions; hydrogencarbonate ions; nitrate ions; acetate ions; perchlorate ions; phosphate ions; alkyloxy ions; trifluoromethane sulfonate ions; bistrifluoromethane sulfonimide ions; hexafluorophosphate ions; and tetrafluoroborate ions etc. may be mentioned.

To determine the content ratio of a unit represented by the formula (1) above in the polyether rubber of the present invention (herein below, referred to as "content ratio of onium ion unit"), a method well known in the art can be used. For simple and quantitative determination of the content ratio of onium ion unit, content of an onium ion-containing group can be quantified by $^1$H-NMR measurement of the polyether rubber of the present invention. Specifically, from the integrated values of the proton derived from the polyether chain that is a main chain of the polyether rubber of the present invention, mole number B1 of the entire monomer units in the polymer (including onium ion unit) is calculated. Subsequently, from the integrated values of the proton derived from an onium ion-containing group, mole number B2 of the onium ion unit introduced (the unit represented by the formula (1)) is calculated. Thereafter, by dividing the mole number B2 of the onium ion unit introduced (the unit represented by the formula (1)) by the mole number B1 of the entire monomer units in the polymer (including onium ion unit), content ratio of onium ion unit can be calculated based on the following formula (2).

$$\text{Content ratio of onium ion unit (mol \%)} = 100 \times B2/B1 \qquad (2)$$

Further, when the onium-forming agent used for the reaction is not consumed by any other reaction other than the substitution reaction of an onium ion-containing group under the reaction condition described above, molar amount of the consumed onium-forming agent will be the same as the molar amount of the onium ion-containing group substituted on the halogen atoms. Thus, by calculating the molar amount of consumed onium-forming agent by subtracting the residual molar amount of A2 after the reaction from the molar amount A1 added before the reaction and the resulting value is divided by molar amount P of the entire monomer units in base polyether rubber before the reaction with an onium-forming agent, content ratio of onium ion unit can be also calculated based on the following formula (3).

$$\text{Content ratio of onium ion unit (mol \%)} = 100 \times (A1 - A2)/P \quad (3)$$

Molar consumption amount can be measured by a known measurement method. The reaction ratio can be measured by gas chromatography (GC) equipped with a capillary column and a flame ionization detector (FID) etc. When GC is employed for calculation of onium ion substitution ratio, measurement of reaction ratio of an onium-forming agent is suitable in that it is highly accurate and can be conveniently carried out without depending on an amount of an onium-forming agent added to obtain the desired content ratio of an onium ion unit in the present invention. In particular, when the content ratio of a unit substituted with an onium ion-containing group is as low as 0.1% to 5% in the entire monomer units, for calculation of content ratio of onium ion-containing group, GC is suitable in terms of accuracy.

Content ratio of the unit represented by the formula (1) needs to be 0.1 mol % or more but less than 30 mol % in the entire monomer units. It is preferably 0.5 mol % or more but less than 25 mol %, and more preferably 0.7 mol % or more but less than 12 mol %. When the content ratio of a unit substituted with an onium ion-containing group in polyether rubber is within the range, polyether rubber having low electrical resistance value and suppressed increase in volume resistivity value caused by electric current can be obtained. However, when the content ratio of a unit substituted with an onium ion-containing group is excessively low, volume resistivity value increases so that the electrical resistance value may increase when voltage is applied continuously. On the other hand, when the content ratio of a unit substituted with an onium ion-containing group is excessively high, the polyether rubber becomes rigid so that properties as a rubber elastomer may be lost.

When the polyether rubber of the present invention is cross-linked, the polyether rubber of the present invention preferably contains a cross-linkable monomer unit. As the preferred cross-linkable monomer unit, an epihalohydrin monomer unit and/or an unsaturated oxide monomer unit are preferable.

Further, when the polyether rubber of the present invention is used as a conductive member, in particular as a material of a conductive roll, polyether rubber of the present invention preferably contains an ethylene oxide monomer unit from the view point of having low electrical resistance.

The polyether rubber of the present invention contains the unit represented by the formula (1) as an essential component, and is preferably a copolymer containing the unit represented by the formula (1) and [epihalohydrin monomer unit and/or unsaturated oxide monomer unit], more preferably a copolymer containing the unit represented by the formula (1), an ethylene oxide monomer unit, and [epihalohydrin monomer unit and/or unsaturated oxide monomer unit], and particularly preferably a copolymer containing the unit represented by the formula (1), an epihalohydrin monomer unit, an unsaturated oxide monomer unit, and ethylene oxide monomer unit.

The unsaturated oxide monomer for forming an unsaturated oxide monomer unit is not specifically limited if it is a compound containing at least one carbon-carbon unsaturated bond (excluding a carbon-carbon unsaturated bond of an aromatic ring) and at least one epoxy group in the molecule. For example, alkenyl glycidyl ethers such as allyl glycidyl ether or butenyl glycidyl ether; and alkenyl epoxides such as 3,4-epoxy-1-butene, 1,2-epoxy-5-hexene, or 1,2-epoxy-9-decene etc. may be mentioned. Of these, alkenyl glycidyl ethers are preferable. Allyl glycidyl ether is more preferable. The unsaturated oxide monomer may be used in combination of two or more. Content ratio of an unsaturated oxide monomer unit in the polyether rubber of the present invention is preferably 15 to 0 mol %, more preferably 12 to 1 mol %, and furthermore preferably 10 to 2 mol % in the entire monomer units. By having the content ratio of an unsaturated oxide monomer unit in the polyether rubber within the above range, polyether rubber with an excellent cross-linking property is obtained. However, when the content ratio of an unsaturated oxide monomer unit is excessively low, compression set may be deteriorated. On the other hand, when the content ratio of an unsaturated oxide monomer unit is too high, a gelling reaction or the like may easily occur during the polymerization, and therefore molding processability may be impaired.

The ethylene oxide monomer unit is a unit consisting of an ethylene oxide monomer. The content ratio of an ethylene oxide monomer unit in the polyether rubber of the present invention is preferably 90 to 0 mol %, more preferably 80 to 20 mol %, and furthermore preferably 75 to 40 mol % in the entire monomer units. By having the content ratio of an ethylene oxide monomer unit in the polyether rubber within the above range, polyether rubber with low electrical resistance is obtained. However, when the content ratio of an ethylene oxide monomer unit is excessively low, it is difficult to obtain an effect of lowering electrical resistance value. On the other hand, when the content ratio of an ethylene oxide monomer unit is too high, it may be difficult to produce polyether rubber.

The polyether rubber of the present invention may be a copolymer which contains, in addition to the unit represented by the formula (1), an epihalohydrin monomer unit, an unsaturated oxide monomer unit, and an ethylene oxide monomer unit, other monomer units that are copolymerizable with the each monomer, if necessary. Among other monomer units, an alkylene oxide monomer unit excluding ethylene oxide is preferable. As an alkylene oxide monomer for forming an alkylene oxide monomer unit excluding ethylene oxide, although not specifically limited, for example, linear or branched alkylene oxide such as propylene oxide, 1,2-epoxy butane, 1,2-epoxy-4-chloro pentane, 1,2-epoxy hexane, 1,2-epoxy octane, 1,2-epoxy decane, 1,2-epoxy octadecane, 1,2-epoxy eicosane, 1,2-epoxy isobutane, or 2,3-epoxy isobutane; cyclic alkylene oxide such as 1,2-epoxychloropentane, 1,2-epoxycyclohexane, or 1,2-epoxycyclododecane; glycidyl ether having a linear or branched alkyl such as butyl glycidyl ether, 2-ethylhexyl glycidyl ether, 2-methyloctylglycidyl ether, neopentyl glycol diglycidyl ether, decyl glycidyl ether, or stearyl glycidyl ether; and glycidyl ether having an oxyethylene side chain such as ethylene glycol diglycidyl ether, diethylene glycol diglycidyl ether, or polyethylene glycol diglycidyl ether etc. may be mentioned. Of these, linear alkylene oxide is preferable, propylene oxide is more preferable. The alkylene oxide monomer may be used in combination of two or more. The content ratio of an alkylene oxide monomer unit excluding ethylene oxide in the polyether rubber of the present invention is preferably 30 mol % or less, more preferably 20 mol % or less, and furthermore preferably 10 mol % or less in the entire monomer units. When the content ratio of an alkylene oxide monomer unit excluding ethylene oxide is excessively high in the polyether rubber, the volume resistivity value may increase.

Other copolymerizable monomer excluding an alkylene oxide monomer is not specifically limited, for example, aryl epoxides such as styrene oxide or phenyl glycidyl ether etc. may be mentioned. The content ratio of other copolymerizable monomer units excluding an alkylene oxide monomer in the polyether rubber of the present invention is preferably 20 mol % or less, more preferably 10 mol % or less, and furthermore preferably 5 mol % or less in the entire monomer units.

The base polyether rubber before the reaction with an onium-forming agent may be obtained by ring-opening polymerization of each monomer described above according to solution polymerization or solvent slurry polymerization.

The polymerization catalyst is not specifically limited if it is a catalyst generally used for polyether polymerization. As the polymerization catalyst, for example, a catalyst obtained by reacting organic aluminum with water and acetyl acetone (Japanese Patent Publication (B) No. 35-15797); a catalyst obtained by reacting triisobutyl aluminum with phosphoric acid and triethylamine (Japanese Patent Publication (B) No. 46-27534); a catalyst obtained by reacting triisobutyl aluminum with an organic salt of diazabicycloundecene and phosphoric acid (Japanese Patent Publication (B) No. 56-51171); a catalyst consisting of a partial hydrolyzate of aluminum alkoxide and an organo zinc compound (Japanese Patent Publication (B) No. 43-2945); a catalyst consisting of an organo zinc compound and polyvalent alcohol (Japanese Patent Publication (B) No. 45-7751); a catalyst consisting of dialkyl zinc and water (Japanese Patent Publication (B) No. 36-3394); and a catalyst consisting of tributyl tin chloride and tributyl phosphate (Japanese Patent No. 3223978) etc. may be mentioned.

As the solvent for polymerization is not specifically limited if it is inert, for example, aromatic hydrocarbons such as benzene or toluene; saturated linear hydrocarbons such as n-pentane or n-hexane; and, saturated cyclic hydrocarbons such as cyclopentane or cyclohexane etc. may be used. Of these, when ring-opening polymerization is carried out based on solution polymerization, aromatic hydrocarbons are preferably used from the view point of solubility of a base polyether rubber before the reaction with an onium-forming agent. Toluene is more preferable.

The temperature for polymerization is preferably 20 to 150° C., and more preferably 50 to 130° C. The polymerization can be carried out according to any mode including a batch type, a semi-batch type, and a continuous type.

The base polyether rubber before reaction with an onium-forming agent may have any copolymerization type including block copolymerization or random copolymerization. However, the random copolymerization type is preferable in that, as crystallinity of the polyethylene oxide is lowered more, it does not easily damage the rubber elasticity of the polyether rubber of the present invention that is finally obtained in onium-containing form.

The polyether rubber of the present invention can be obtained by adding an onium-forming agent to a solvent in which base polyether rubber obtained by ring-opening polymerization of each monomers is dissolved and subjecting at least part of the halogen atoms which constitute an epihalohydrin monomer unit to an onium-forming reaction. Further, the polyether rubber can be also obtained by recovering first the base polyether rubber that is obtained by ring-opening polymerization of each monomer and adding an onium-forming agent and a solvent to the base polyether rubber for an onium-forming reaction. However, the method is not specifically limited.

The method for recovery of the polyether rubber of the present invention from a solvent is not specifically limited. For example, it is carried out by appropriately combining coagulation, filtration, and drying. As a method of coagulating the polyether rubber of the present invention from a solvent in which the polyether rubber of the present invention is dissolved, a common method such as steam stripping or precipitation using a poor solvent can be used. Further, As a method of filtering the polyether rubber from slurry containing the polyether rubber, a sieve such as a rotary type screen or a vibrating screen; a centrifugal dehydrator; etc. may be used, if necessary. As the method of drying the polyether rubber of the present invention, a dehydration method using a compression type dehydrator such as roll, Banbury type dehydrator, or screw extruder type dehydrator and a method of using a dryer such as screw type extruder, kneader type dryer, expander type dryer, heat wave type dryer, or reduced pressure type dryer etc. may be mentioned. The compression type dehydrator and dryer may be used either singly or in combination of two or more.

Weight average molecular weight of the polyether rubber of the present invention is preferably 200,000 to 2,000,000, more preferably 400,000 to 1,500,000, and furthermore preferably 600,000 to 1,100,000. When the weight average molecular weight is too high, Mooney viscosity increases, thus making it difficult to achieve molding processing. On the other hand, when the weight average molecular weight is too small, compression set of the cross-linked rubber obtained may be deteriorated.

Mooney viscosity of the polyether rubber of the present invention (polymer Mooney viscosity $ML_{1+4}$, 100° C.) is preferably 10 to 120, more preferably 20 to 90, and furthermore preferably 20 to 80. When the Mooney viscosity is excessively high, molding processability is impaired and molding into a conductive member is difficult to achieve. Further, due to an occurrence of swell (that is, diameter of an extruded article is larger than the diameter of a die during extrusion molding), size stability may be impaired. On the other hand, when the Mooney viscosity is excessively small, mechanical strength of the cross-linked rubber obtained may be lowered.

Rubber Composition

The rubber composition of the present invention preferably contains the polyether rubber of the present invention and a cross-linking agent.

As the cross-linking agent, although not specifically limited, for example, sulfur such as powdery sulfur, precipitated sulfur, colloidal sulfur, insoluble sulfur, or highly dispersed sulfur; sulfur-containing compounds such as sulfur monochloride, sulfur dichloride, morpholine disulfide, alkyl phenol disulfide, dibenzothiazyl disulfide, N,N'-dithio-bis (hexahydro-2H-azenopine-2), phosphorus-containing polysulfide, or polymer sulfides; organic peroxides such as dicumyl peroxide or di-t-butyl peroxide; quinone dioximes such as p-quinone dioxime or p,p'-dibenzoylquinone dioxime; organic polyvalent amine compounds such as triethylene tetramine, hexamethylene diamine carbamate, or 4,4'-methylene bis-o-chloroaniline; triazine compounds such as s-triazine-2,4,6-trithiol; and an alkyl phenol resins having a methylol group; etc. may be mentioned. Among these compounds, sulfur or a sulfur-containing compound is preferable. These cross-linking agents may be used either singly or in combination of two or more. The addition ratio of the cross-linking agent is, although not specifically limited, preferably 0.1 to 10 parts by weight, more preferably 0.2 to 7 parts by weight, and particularly preferably 0.3 to 5 parts by weight with respect to 100 parts by weight of the polyether rubber. When the addition amount of the cross-linking agent is excessively small, the cross-linking rate is lowered so that productivity of the cross-linked rubber may be lowered. Further, when the cross-linked rubber obtained thereby is used after grinding, the grindability may be impaired. On the other hand, when the addition amount of the cross-linking agent is excessively high, there is a possibility that the hardness of the cross-linked rubber obtained thereby may increase or the cross-linking agent may bloom.

When sulfur or a sulfur-containing compound is used as a cross-linking agent, it is preferable to use a cross-linking aid and a cross-linking accelerator in combination. As the cross-linking aid, although not specifically limited, for example, zinc oxide and stearic acid etc. may be mentioned. As the cross-linking accelerator, for example, although not specifically limited, cross-linking accelerators such as guanidine-based; aldehyde/amine based; aldehyde/ammonia-based; thiazole-based; sulfenamide based; thiourea-based; thiuram-based; and dithiocarbmaic acid salt-based; etc. may be mentioned. The cross-linking aids and cross-linking accelerators may be each used either in combination of two or more.

Use amount of the cross-linking aid and cross-linking accelerator is, although not specifically limited, preferably 0.01 to 15 parts by weight, and more preferably in 0.1 to 10 parts by weight with respect to 100 parts by weight of the polyether rubber of the present invention. When the cross-linking aid and cross-linking accelerator are present in an excessively high amount, the cross-linking rate may be too fast or a blooming may occur on the surface of the cross-linked rubber. On the other hand, when they are present in an excessively small amount, the cross-linking rate is too slow to impair the productivity, or due to insufficient cross-linking, mechanical properties of the cross-linked rubber obtained may be deteriorated.

The rubber composition of the present invention may further contain, within the range that the effect of the present invention is not impaired, diene-based rubber such as butadiene rubber, styrene butadiene rubber, chloroprene rubber, isoprene rubber, natural rubber, acrylonitrile butadiene rubber, butyl rubber, or partially hydrogenated product of those rubbers (for example, hydrogenated nitrile rubber); rubber other than the diene-based rubber such as ethylene propylene rubber, acrylic rubber, polyether rubber (excluding the polyether rubber of the present invention), fluororubber, or silicone rubber; thermoplastic elastomer such as olefin-based thermoplastic elastomer, styrene-based thermoplastic elastomer, vinyl chloride-based thermoplastic elastomer, polyester-based thermoplastic elastomer, polyamide-based thermoplastic elastomer, or polyurethane-based thermoplastic elastomer; and a resin such as polyvinyl chloride, a cumarone resin, or a phenol resin. The rubber, thermoplastic elastomer, and resin may be used either singly or in combination of two or more. Total amount of them is preferably 100 parts by weight or less, more preferably 50 parts by weight or less, and furthermore preferably 20 parts by weight or less with respect to 100 parts by weight of the polyether rubber of the present invention.

In addition to the additives described above, the rubber composition of the present invention may also contain other additives that are generally blended into rubber. As the other additives, although not specifically limited, for example, acid acceptors, reinforcing agents, fillers, antioxidants, UV absorbing agents, light stabilizers, tackifiers, surfactants, conductivity imparting materials, electrolyte materials, colorants (dye and pigment), flame retardants; anti-static agents; etc. may be mentioned.

The rubber composition of the present invention can be produced according to a desired method by combining and kneading the polyether rubber of the present invention with a cross-linking agent and components that are used as required.

For example, by kneading the polyether rubber with additives other than a cross-linking agent and a cross-linking accelerator and adding the cross-linking agent and cross-linking accelerator to the mixture, a rubber composition can be obtained. For combining and kneading, any kneading molder such as a kneader, a Banbury mixer, an open roll, a calendar roll, or an extruder may be used either singly or in combination of two or more to achieve kneading and molding. The temperature for kneading the polyether rubber with additives other than a cross-linking agent and a cross-linking accelerator is preferably 20 to 200° C., and more preferably 20 to 150° C. The kneading time is preferably 30 seconds to 30 minutes. The temperature for mixing a kneaded mixture with a cross-linking agent and a cross-linking accelerator is preferably 100° C. or less, and more preferably 0 to 80° C.

Cross-Linked Rubber

The cross-linked rubber of the present invention is obtained by molding and cross-linking the rubber composition of the present invention which contains a cross-linking agent.

The method for cross-linking the rubber composition of the present invention is not specifically limited. The cross-linking may be carried out either simultaneously with molding or after molding. The temperature for molding is preferably 20 to 200° C., and more preferably 40 to 180° C. The heating temperature for cross-linking is preferably 130 to 200° C., and more preferably 140 to 200° C. When the heating temperature for cross-linking is excessively low, a long time may be required for cross-linking or the cross-linking density of the cross-linked rubber obtained may be lowered. On the other hand, when the heating temperature for cross-linking is excessively high, molding defects may be yielded. The cross-linking time varies depending on cross-linking method, cross-linking temperature, shape, or the like. However, when it is within the range of 1 minute or more and 5 hours or less, it is preferable from the view point of cross-linking density and production efficiency. As a method of heating, any method selected from press heating, oven heating, steam heating, heat wave heating, and microwave heating etc. may be suitably used.

Further, depending on shape and size of the cross-linked rubber, cross-linking may not be fully progressed inside the product even when the cross-linking is found on the surface of the product. In such case, secondary cross-linking may be carried out by further heating. For carrying out secondary cross-linking, the heating temperature is preferably from 100 to 220° C., and more preferably 130 to 210° C. The heating time is preferably 30 minutes to 5 hours.

The volume resistivity value of the cross-linked rubber of the present invention is generally $1\times10^{5.0}$ to $1\times10^{9.5}$ Ω·cm, preferably $1\times10^{6.0}$ to $1\times10^{7.6}$ Ω·cm, and more preferably $1\times10^{6.0}$ to $1\times10^{7.5}$ Ω·cm in terms of the value measured 30 seconds after applying voltage (1,000 V) under the measurement condition including temperature of 23° C. and humidity of 50%. When the volume resistivity value of the cross-linked rubber falls within the above range, a conductive member with excellent low electrical resistance is obtained. Meanwhile, when the volume resistivity value of the cross-linked rubber is excessively high, higher voltage should be applied to obtain the same amount of electric current, causing increased power consumption, and therefore it is undesirable for a conductive member. On the other hand, when the volume resistivity value of the cross-linked rubber is excessively low, electric current may flow in an undesired direction other than the direction applied with voltage, and thus the function as a conductive member may be impaired.

An increase value in volume resistivity value of the cross-linked rubber of the present invention that is caused by electric current is preferably within the range of 0 to 0.5 in terms of the value obtained by subtracting the log value of volume resistivity value obtained 30 seconds after applying voltage from the log value of volume resistivity value obtained 10 minutes after applying voltage under the condition for measuring volume resistivity value as described above.

Since the cross-linked rubber of the present invention is obtained by using the polyether rubber of the present invention, it has low electrical resistance value and suppressed increase in electrical resistance value even after continuous use.

Conductive Member

The conductive member of the present invention contains the cross-linked rubber of the present invention.

From the view point of the characteristics thereof, the cross-linked rubber of the present invention is useful as a material for various industrial rubber products. Although it is not specifically limited, the cross-linked rubber of the present invention can be used for a conductive member such as a conductive roll, a conductive blade, or a conductive belt that are used for a copying machine or a printer; a material for a shoe sole or a hose; a material for a belt such as a conveyor belt or a hand-rail of an escalator; a seal, and a packing material or the like. In particular, the cross-linked rubber containing the polyether rubber of the present invention has low electrical resistance value and suppressed increase in electrical resistance value even after continuous use, and therefore it can be suitably used for a conductive member used for a copying machine, a printer, or the like, especially for a conductive roll.

EXAMPLES

Herein below, the present invention is described in detail with reference to the examples and comparative examples. Further, "parts" and "%" in each example are based on weight, unless specifically described otherwise.

Various physical properties were evaluated according to the methods described below.

[Measurement of Molecular Weight]

Weight average molecular weight (Mw) of the polyethylene rubber was measured in terms of a polystyrene conversion by gel permeation chromatography using N,N-dimethyl formamide as a solvent.

Measurement apparatus: HLC-8320 (made by TOSOH CORPORATION)

Column: TSK gel α-M (made by TOSOH CORPORATION), two columns were connected in series Detector: Differential refractometer RI-8320 (made by TOSOH CORPORATION)

Column temperature: 40° C.

[Content Ratio of Unit Substituted with Onium Ion-Containing Group (Content Ratio of Onium Ion Unit)]

Measurement of the content ratio of a unit substituted with an onium ion-containing group (i.e., content ratio of onium ion unit) in each example and comparative example was carried out as follows by gas chromatography (GC) using helium as a carrier gas. Specifically, 0.5 part of a solution obtained after onium-forming reaction, and 0.1 part of normal octane were added to 2.5 parts of hexane and obtained mixture were vigorously stirred for 30 minutes by using a magnetic stirrer. As a result, the onium-containing polyether rubber was coagulated and the hexane phase was collected as an upper phase solution. Accordingly, the residual onium-forming agent was separated from the residual halogen atoms which constitute residual epihalohydrin monomer units. The hexane phase as an upper layer obtained was subjected to GC measurement to measure the amount of residual onium-forming agent. Based on the initial molar amount A1 of the onium-forming agent added to the reaction system, and the molar amount A2 of the residual onium-forming agent after the reaction, which was measured from the peak area intensity ratio of GC, the molar amount of the onium-forming agent which contributed to the reaction was calculated. Based on ratio between the molar amount of the onium-forming agent which contributed to the reaction as obtained above and the molar amount P of the entire units in base polyether rubber before the reaction with an onium-forming agent added to the reaction system, the content ratio of an onium ion unit was calculated by the following formula (3).

Content ratio of an onium ion unit (mol %)=100×($A1$−$A2$)/$P$ (3)

Further, when the content ratio of a unit substituted with an onium ion-containing group (i.e., content ratio of onium ion unit) in each example and comparative example was measured according to the method using a nuclear magnetic resonance ($^1$H-NMR) machine as described below, the results obtained were the same as those obtained by gas chromatography described above. According to a method using a nuclear magnetic resonance machine, 30 mg of the cationized polyether rubber, which had been obtained by the onium-forming followed by coagulation and drying, was added to 1.0 mL of deuterated chloroform and shaked for 1 hour for homogenous dissolution. The obtained solution was then measured by $^1$H-NMR to calculate the content ratio of onium ion unit. Specifically, from the integrated values of the proton derived from the polyether chain, which is, a main chain of the cationized polyether rubber, mole number B1 of the entire monomer units in the polymer (including onium ion unit) was calculated. Subsequently, from the integrated values of the proton derived from an onium ion-containing group, mole number B2 of the introduced onium ion units (i.e., the unit represented by the formula (1)) was calculated. Thereafter, by dividing the mole number B2 of the introduced onium ion units (i.e., the unit represented by the formula (1)) by the mole number B1 of the entire monomer units in the polymer (including onium ion unit), content ratio of onium ion unit was calculated as represented by the following formula (2)

Content ratio of onium ion unit (mol %)=100×$B2$/$B1$ (2)

[Mooney Viscosity]

The measurement was carried out at 100° C. according to JIS K6300.

[Volume Resistivity Value (23° C., 50% RH)]

A cross-linked rubber in sheet shape with a size of length 15 cm×width 10 cm×thickness 2 mm was obtained by molding and cross-linking of a rubber composition at 160° C. for 30 minutes by using a press. Thereafter, by using the cross-linked rubber in sheet shape, volume resistivity value was measured. Measurement of volume resistivity value was carried out according to the double ring electrode method as specified by JIS K6271. The measurement condition includes temperature of 23° C., humidity of 50%, and applied voltage of 1,000 V. Values were measured 30 seconds after applying the voltage.

[Increase Value in Volume Resistivity Value Caused by Electric Current (23° C., 50% RH)]

An increase value in volume resistivity value that was caused by electric current was obtained by subtracting the log value of volume resistivity value obtained 30 seconds after applying voltage from the log value of volume resistivity value obtained 10 minutes after applying voltage under the condition for measuring volume resistivity value as described above. In other words, an increase value in volume resistivity value caused by electric current was obtained as a log value. Further, improvement ratio of the increase caused by electric current is defined by the following formula.

> Improvement ratio of increase caused by electric current (%)=100×[(Increase value of volume resistivity value of base polyether rubber caused by electric current)−(Increase value of volume resistivity value of onium-containing polyether rubber caused by electric current)]/(Increase value of volume resistivity value of base polyether rubber caused by electric current)

The base polyether rubber of the onium-containing polyether rubber in the Examples 1 to 8 corresponds to polyether rubber A used in the Comparative example 1, the base polyether rubber of the onium-containing polyether rubber in the Example 9 corresponds to polyether rubber B used in the Comparative example 2, the base polyether rubber of the onium-containing polyether rubber in the Example 10 corresponds to polyether rubber C used in the Comparative example 3, and the base polyether rubber of the onium-containing polyether rubber in the Example 11 corresponds to polyether rubber D used in the Comparative example 4.

Production Example 1

Preparation of Polymerization Catalyst

Inside of a sealed pressure-resistant glass vessel was purged with nitrogen gas and added with 200 parts of toluene and 60 parts of triisobutyl aluminum. The glass vessel was immersed in ice water for cooling and added with 230 parts of diethyl ether followed by stirring. Subsequently, 13.6 parts of phosphoric acid were further added under ice cooling, and then stirred. Since the pressure inside the vessel increases in accordance with a reaction between triisobutyl aluminum and phosphoric acid, the vessel was de-pressurized at appropriate moment. The reaction mixture obtained was aged and reacted for 1 hour in a hot-water bath at 60° C. to give a catalyst solution.

Production Example 2

Production of Polyether Rubber A

An autoclave was charged with 223.5 parts of epichlorohydrin, 27.5 parts of allyl glycidyl ether, 19.7 parts of ethylene oxide, and 2585 parts of toluene and the mixture was heated to 50° C. while being stirred under nitrogen atmosphere. By adding 11.6 parts of the catalyst solution obtained above, the reaction was initiated. Subsequently, a solution containing 129.3 parts of ethylene oxide dissolved in 302 parts of toluene was continuously added for 5 hours at constant rate from the start of the reaction. In addition, 6.2 parts of the catalyst solution was added every 30 minutes for 5 hours from the start of the reaction. Subsequently, 15 parts of water was added and stirred to terminate the reaction. As an antioxidant, 45 parts of toluene solution containing 5% 4,4'-thiobis-(6-tert-butyl-3-methylphenol) was added and stirred. After performing steam stripping, the upper layer solution was removed and dried in vacuo at 60° C. to obtain 400 parts of the polyether rubber A. Composition ratio of the monomers in the polyether rubber A included 40 mol % of an epichlorohydrin monomer unit, 56 mol % of an ethylene oxide monomer unit, and 4 mol % of an allyl glycidyl ether monomer unit. Further, it was found that the weight average molecular weight was 890,000 and the Mooney viscosity was 60.

Production Example 3

Production of Polyether Rubber B

An autoclave was charged with 198.6 parts of epichlorohydrin, 28.9 parts of allyl glycidyl ether, 22.8 parts of ethylene oxide, and 2585 parts of toluene and the mixture was heated to 50° C. while being stirred under nitrogen atmosphere. By adding 11.6 parts of the catalyst solution obtained above, the reaction was initiated. Subsequently, a solution containing 149.7 parts of ethylene oxide dissolved in 302 parts of toluene was continuously added for 5 hours at constant rate from the start of the reaction. In addition, 6.2 parts of the catalyst solution was added every 30 minutes for 5 hours from the start of the reaction. Subsequently, 15 parts of water was added and stirred to terminate the reaction. As an antioxidant, 45 parts of toluene solution containing 5% 4,4'-thiobis-(6-tert-butyl-3-methylphenol) was added and stirred. After performing steam stripping, the upper layer solution was removed and dried in vacuo at 60° C. to obtain 400 parts of the polyether rubber B. Composition ratio of the monomers in the polyether rubber B included 34 mol % of an epichlorohydrin monomer unit, 62 mol % of an ethylene oxide monomer unit, and 4 mol % of an allyl glycidyl ether monomer unit. Further, it was found that the weight average molecular weight was 750,000 and the Mooney viscosity was 45.

Production Example 4

Production of Polyether Rubber C

An autoclave was charged with 161.8 parts of epichlorohydrin, 30.7 parts of allyl glycidyl ether, 26.9 parts of ethylene oxide, and 2585 parts of toluene and the mixture was heated to 50° C. while being stirred under nitrogen atmosphere. By adding 11.6 parts of the catalyst solution obtained above, the reaction was initiated. Subsequently, a solution containing 180.6 parts of ethylene oxide dissolved in 302 parts of toluene was continuously added for 5 hours at constant rate from the start of the reaction. In addition, 6.2 parts of the catalyst solution was added every 30 minutes for 5 hours from the start of the reaction. Subsequently, 15 parts of water was added and stirred to terminate the reaction. As an antioxidant, 45 parts of toluene solution containing 5% 4,4'-thiobis-(6-tert-butyl-3-methylphenol) was added and stirred. After performing steam stripping, the upper layer solution was removed and dried in vacuo at 60° C. to obtain 400 parts of the polyether rubber C. Composition ratio of the monomers in the polyether rubber C included 26 mol % of an epichlorohydrin monomer unit, 70 mol % of an ethylene oxide monomer unit, and 4 mol % of an allyl glycidyl ether monomer unit. Further, it was found that the weight average molecular weight was 900,000 and the Mooney viscosity was 67.

Production Example 5

Production of Polyether Rubber D

An autoclave was charged with 400.0 parts of epichlorohydrin and 2887 parts of toluene and the mixture was heated to 50° C. while being stirred under nitrogen atmosphere. By adding 11.6 parts of the catalyst solution obtained above, the reaction was initiated. In addition, 6.2 parts of the catalyst solution was added every 30 minutes for 5 hours from the start of the reaction. Subsequently, 15 parts of water was added and stirred to terminate the reaction. As an antioxidant, 45 parts of toluene solution containing 5% 4,4'-thiobis-(6-tert-butyl-3-methylphenol) was added and stirred. After performing steam stripping, the upper layer solution was removed and dried in vacuo at 60° C. to obtain 400 parts of the polyether rubber D. Composition ratio of the monomers in the polyether rubber D included 100 mol % of an epichlorohydrin monomer unit. Further, it was found that the weight average molecular weight was 700,000 and the Mooney viscosity was 70.

Example 1

Production of Onium-Containing Polyether Rubber 1

A glass reactor equipped with a stirrer was charged with 192 parts of the polyether rubber A and 1266 parts of toluene. By stirring at 50° C. for 12 hours, the polyether rubber was dissolved. Subsequently, 73 parts of methanol was added thereto and stirred for 15 minutes. The polyether rubber mixture obtained was then added with 2.9 parts of n-butyl dimethylamine, and after elevating the temperature to 75° C. under stirring, the reaction was carried out at 75° C. for 2 hours. After 2 hours, the reaction solution was cooled to 20° C. to terminate the reaction. 1 part of the reaction solution was mixed with 5 parts of hexane and stirred for 30 minutes to coagulate the polymer phase. The organic phase in the upper layer was collected and used as a sample to measure the reaction ratio of n-butyl dimethylamine by GC. As a result, the reaction ratio was found to be 75%. The reaction solution was coagulated by distillation of the solvent in steam, and then dried in vacuo to obtain the onium-containing polyether rubber 1 with yield of 190 parts. Content ratio of an onium ion unit in the onium-containing polyether rubber 1 obtained was 0.75 mol %, the weight average molecular weight was 900,000, and the Mooney viscosity was 59.

Production of Rubber Composition 1 and Cross-Linked Rubber 1

To a Banbury mixer, 1100 parts of the onium-containing polyether rubber 1 obtained above, 10 parts of carbon black as a filler (SEAST SO, made by Tokai Carbon Co., Ltd.), 5 parts of zinc oxide No. 1 as a cross-linking aid (ZnO 41, made by Seido Chemical Industry Co., Ltd.), and 0.5 part of stearic acid as a cross-linking aid were added. After kneading for 5 minutes at 50° C., the rubber composition was extruded from the Banbury mixer. Subsequently, an open roll at 50° C. was charged with the rubber composition obtained, 0.5 part of sulfur as a cross-linking agent (SULFAX PMC, made by Tsurumichemical), 1 part of morpholine disulfide as a cross-linking agent (VULNOC R, made by Ouchi Shinko Chemical Industrial Co., Ltd.), 1 part of tetraethyl thiuram disulfide (NOCCELER TET, made by Ouchi Shinko Chemical Industrial Co., Ltd.) and 1.5 parts of dibenzothiazyl disulfide (NOCCELER DM, made by Ouchi Shinko Chemical Industrial Co., Ltd.) as a cross-linking accelerator. After kneading for 10 minutes, the rubber composition 1 in sheet shape was taken out. The rubber composition 1 was then subjected to press cross-linking for 30 minutes at 160° C. to prepare the cross-linked rubber 1 (test specimen 1), and the test specimen 1 was evaluated for volume resistivity value (23° C., 50% RH) or the like. The results are given in the Table 1.

TABLE 1

| | Example | | | | | | | | |
|---|---|---|---|---|---|---|---|---|---|
| | 1 | 2 | 3 | 4 | 5 | 6 | 7 | 8 | 9 |
| Base polyether rubber | Polyether rubber A EO/ECH/AGE = 56/10/4 | | | | | | | | Polyether rubber B EO/ECH/AGE = 62/34/4 |
| Onium-forming agent | nBuMe$_2$N | | | | | | Me$_3$N | | nBuMe$_2$N |
| Content ratio of onium ion unit (mol %) | 0.75 | 1.32 | 2.54 | 3.79 | 5.44 | 4.90 | 10.03 | 20.01 | 2.01 |
| Composition ratio of polyether rubber after onium-forming reaction EO/ECH/N+/AGE | 56/39.25/ 0.75/4 | 56/38.68/ 1.32/4 | 56/37.46/ 2.54/4 | 56/36.21/ 3.79/4 | 56/34.56/ 5.44/4 | 56/35.10/ 4.90/4 | 56/29.97/ 10.03/4 | 56/19.99/ 20.01/4 | 62/31.99/ 2.01/4 |
| Weight average molecular weight | 900,000 | 1,020,000 | 870,000 | 960,000 | 990,000 | 930,000 | 910,000 | 910,000 | 650,000 |
| Mooney viscosity | 59 | 58 | 57 | 58 | 55 | 65 | 71 | 84 | 41 |
| Log (Volume resistivity value) | 7.22 | 7.18 | 7.22 | 7.23 | 7.19 | 7.36 | 7.18 | 7.12 | 7.34 |
| Increase value in volume resistivity value caused by electric current | 0.37 | 0.19 | 0.16 | 0.09 | 0.01 | 0.05 | 0.04 | 0.15 | 0.37 |

TABLE 1-continued

| | Example | | Comparative example | | | | |
| --- | --- | --- | --- | --- | --- | --- | --- |
| | 10 | 11 | 1 | 2 | 3 | 4 | 5 |
| Base polyether rubber | Polyether rubber C EO/ECH/AGE = 70/26/4 | Polyether rubber D ECH = 100 | Polyether rubber A EO/ECH/AGE = 56/40/4 | Polyether rubber B EO/ECH/AGE = 62/34/4 | Polyether rubber C EO/ECH/AGE = 70/26/4 | Polyether rubber D ECH = 100 | Polyether rubber A EO/ECH/AGE = 56/40/4 |
| Onium-forming agent | nBuMe$_2$N | | — | — | — | — | Me$_3$N |
| Content ratio of onium ion unit (mol %) | 2.02 | 1.45 | 0.00 | | | | 33.00 |
| Composition ratio of polyether rubber after onium-forming reaction EO/ECH/N+/AGE | 70/23.98/2.02/4 | 0/98.55/1.45/0 | 56/40/0/4 | 62/34/0/4 | 70/26/0/4 | 0/100/0/0 | 56/7/33/4 |
| Weight average molecular weight | 860,000 | 650,000 | 890,000 | 750,000 | 900,000 | 700,000 | 890,000 |
| Mooney viscosity | 65 | 68 | 60 | 45 | 67 | 70 | Impossible to measure |
| Log (Volume resistivity value) | 7.24 | 9.20 | 7.71 | 7.70 | 7.80 | 9.70 | Impossible to measure |
| Increase value in volume resistivity value caused by electric current | 0.46 | 0.05 | 0.51 | 0.65 | 0.68 | 0.10 | Impossible to measure |
| Improvement ratio of increase caused by electric current [%] | 32 | 50 | — | — | — | — | — |

| Improvement ratio of increase caused by electric current [%] | 27 | 63 | 69 | 82 | 98 | 90 | 92 | 71 | 43 |

*In the Table, EO: ethylene oxide monomer unit, ECH: epichlorohydrin monomer unit, and AGE: aryl glycidyl ether monomer unit.
nBuMe$_2$N: n-butyl dimethylamine, Me$_3$N: trimethylamine
N+: It indicates an onium ion unit (i.e., a unit represented by the formula (1)).

Example 2

Production of Onium-Containing Polyether Rubber 2

A glass reactor equipped with a stirrer was charged with 190 parts of the polyether rubber A and 1250 parts of toluene. By stirring at 50° C. for 12 hours, the polyether rubber A was dissolved. Subsequently, 72 parts of methanol was added thereto and stirred for 15 minutes. The polyether rubber mixture obtained was then added with 5.8 parts of n-butyl dimethylamine, and after elevating the temperature to 75° C. under stirring, the reaction was carried out at 75° C. for 2 hours. After 2 hours, the reaction solution was cooled to 20° C. to terminate the reaction. 1 part of the reaction solution was mixed with 5 parts of hexane and stirred for 30 minutes to coagulate the polymer phase. The organic phase in the upper layer was collected and used as a sample to measure the reaction ratio of n-butyl dimethylamine by GC. As a result, the reaction ratio was found to be 66%. The reaction solution was coagulated by distillation of the solvent in steam, and then dried in vacuo to obtain the onium-containing polyether rubber 2 with yield of 186 parts. Content ratio of an onium ion unit in the onium-containing polyether rubber 2 obtained was 1.32 mol %, the weight average molecular weight was 1,020,000, and the Mooney viscosity was 58.

Production of Rubber Composition 2 and Cross-Linked Rubber 2

The rubber composition 2 and cross-linked rubber 2 (test specimen 2) were produced in the same manner as the Example 1 except that 100 parts of the onium-containing polyether rubber 2 was used instead of 100 parts of the onium-containing polyether rubber 1. The test specimen 2 was evaluated for volume resistivity value (23° C., 50% RH) or the like. The results are given in the Table 1.

Example 3

Production of Onium-Containing Polyether Rubber 3

A glass reactor equipped with a stirrer was charged with 169 parts of the polyether rubber A and 1110 parts of toluene. By stirring at 50° C. for 12 hours, the polyether rubber A was dissolved. Subsequently, 68 parts of methanol was added thereto and stirred for 15 minutes. The polyether rubber mixture obtained was then added with 10.3 parts of n-butyl dimethylamine, and after elevating the temperature to 75° C. under stirring, the reaction was carried out at 75° C. for 12 hours. After 12 hours, the reaction solution was cooled to 20° C. to terminate the reaction. 1 part of the reaction solution was mixed with 5 parts of hexane and stirred for 30 minutes to coagulate the polymer phase. The organic phase in the upper layer was collected and used as a sample to measure the reaction ratio of n-butyl dimethylamine by GC. As a result, the reaction ratio was found to be 63%. The reaction solution was coagulated by distillation of the solvent in steam, and then dried in vacuo to obtain the onium-containing polyether rubber 3 with yield of 170 parts. Content ratio of an onium ion unit in the onium-containing polyether rubber 3 obtained was 2.54 mol %, the weight average molecular weight was 870,000, and the Mooney viscosity was 57.

Production of Rubber Composition 3 and Cross-Linked Rubber 3

The rubber composition 3 and cross-linked rubber 3 (test specimen 3) were produced in the same manner as the Example 1 except that 100 parts of the onium-containing polyether rubber 3 was used instead of 100 parts of the onium-containing polyether rubber 1. The test specimen 3 was evaluated for volume resistivity value (23° C., 50% RH) or the like. The results are given in the Table 1.

Example 4

Production of Onium-Containing Polyether Rubber 4

A glass reactor equipped with a stirrer was charged with 150 parts of the polyether rubber A and 983 parts of toluene. By stirring at 50° C. for 12 hours, the polyether rubber A was dissolved. Subsequently, 57 parts of methanol was added thereto and stirred for 15 minutes. The polyether rubber mixture obtained was then added with 18.3 parts of n-butyl dimethylamine, and after elevating the temperature to 75° C. under stirring, the reaction was carried out at 75° C. for 24 hours. After 24 hours, the reaction solution was cooled to 20° C. to terminate the reaction. 1 part of the reaction solution was mixed with 5 parts of hexane and stirred for 30 minutes to coagulate the polymer phase. The organic phase in the upper layer was collected and used as a sample to measure the reaction ratio of n-butyl dimethylamine by GC. As a result, the reaction ratio was found to be 50%. The reaction solution was coagulated by distillation of the solvent in steam, and then dried in vacuo to obtain the onium-containing polyether rubber 4 with yield of 152 parts. Content ratio of an onium ion unit in the onium-containing polyether rubber 4 obtained was 3.79 mol %, the weight average molecular weight was 960,000, and the Mooney viscosity was 58.

Production of Rubber Composition 4 and Cross-Linked Rubber 4

The rubber composition 4 and cross-linked rubber 4 (test specimen 4) were produced in the same manner as the Example 1 except that 100 parts of the onium-containing polyether rubber 4 was used instead of 100 parts of the onium-containing polyether rubber 1. The test specimen 4 was evaluated for volume resistivity value (23° C., 50% RH) or the like. The results are given in the Table 1.

Example 5

Production of Onium-Containing Polyether Rubber 5

A glass reactor equipped with a stirrer was charged with 154 parts of the polyether rubber A and 1011 parts of toluene. By stirring at 50° C. for 12 hours, the polyether rubber A was dissolved. Subsequently, 58 parts of methanol was added thereto and stirred for 15 minutes. The polyether rubber mixture obtained was then added with 37.6 parts of n-butyl dimethylamine, and after elevating the temperature to 75° C. under stirring, the reaction was carried out at 75° C. for 48 hours. After 48 hours, the reaction solution was cooled to 20° C. to terminate the reaction. 1 part of the reaction solution was mixed with 5 parts of hexane and stirred for 30 minutes to coagulate the polymer phase. The organic phase in the upper layer was collected and used as a sample to measure the reaction ratio of n-butyl dimethylamine by GC. As a result, the reaction ratio was found to be 336. The reaction solution was coagulated by distillation of the solvent in steam, and then dried in vacuo to obtain the onium-containing polyether rubber 5 with yield of 156 parts. Content ratio of an onium ion unit in the onium-containing polyether rubber 5 obtained was 5.44 mol %, the weight average molecular weight was 990,000, and the Mooney viscosity was 55.

Production of Rubber Composition 5 and Cross-Linked Rubber 5

The rubber composition 5 and cross-linked rubber 5 (test specimen 5) were produced in the same manner as the Example 1 except that 100 parts of the onium-containing polyether rubber 5 was used instead of 100 parts of the onium-containing polyether rubber 1. The test specimen 5 was evaluated for volume resistivity value (23° C., 50% RH) or the like. The results are given in the Table 1.

Example 6

A glass reactor equipped with a stirrer was charged with 132 parts of the polyether rubber A and 868 parts of toluene. By stirring at 50° C. for 12 hours, the polyether rubber A was dissolved. Subsequently, 50 parts of methanol was added thereto and stirred for 15 minutes. The polyether rubber mixture obtained was then added with 2.36 parts of trimethylamine, and after elevating the temperature to 75° C. under stirring, the reaction was carried out at 75° C. for 24 hours. After 24 hours, the reaction solution was cooled to 20° C. to terminate the reaction. 1 part of the reaction solution was mixed with 5 parts of hexane and stirred for 30 minutes to coagulate the polymer phase. The organic phase in the upper layer was collected and used as a sample to measure the reaction ratio of trimethylamine by GC. As a result, the reaction ratio was found to be 98%. The reaction solution was coagulated by distillation of the solvent in steam, and then dried in vacuo to obtain the onium-containing polyether rubber 6 with yield of 128 parts. Content ratio of an onium ion unit in the onium-containing polyether rubber 6 obtained was 4.90 mol %, the weight average molecular weight was 930,000, and the Mooney viscosity was 65.

Production of Rubber Composition 6 and Cross-Linked Rubber 6

The rubber composition 6 and cross-linked rubber 6 (test specimen 6) were produced in the same manner as the Example 1 except that 100 parts of the onium-containing polyether rubber 6 was used instead of 100 parts of the onium-containing polyether rubber 1. The test specimen 6 was evaluated for volume resistivity value (23° C., 50% RH) or the like. The results are given in the Table 1.

Example 7

Production of Onium-Containing Polyether Rubber 7

A glass reactor equipped with a stirrer was charged with 161 parts of the polyether rubber A and 1063 parts of toluene. By stirring at 50° C. for 12 hours, the polyether rubber A was dissolved. Subsequently, 61 parts of methanol was added thereto and stirred for 15 minutes. The polyether rubber mixture obtained was then added with 21.4 parts of trimethylamine, and after elevating the temperature to 75° C. under stirring, the reaction was carried out at 75° C. for 3 days. After 3 days, the reaction solution was cooled to 20° C. to terminate the reaction. 1 part of the reaction solution was mixed with 5 parts of hexane and stirred for 30 minutes to coagulate the polymer phase. The organic phase in the upper layer was collected and used as a sample to measure the reaction ratio of trimethylamine by GC. As a result, the reaction ratio was found to be 69%. The reaction solution was coagulated by distillation of the solvent in steam, and then dried in vacuo to obtain the onium-containing polyether rubber 7 with yield of 163 parts. Content ratio of an onium ion unit in the onium-containing polyether rubber 7 obtained was 10.03 mol %, the weight average molecular weight was 910,000, and the Mooney viscosity was 71.

Production of Rubber Composition 7 and Cross-Linked Rubber 7

The rubber composition 7 and cross-linked rubber 7 (test specimen 7) were produced in the same manner as the Example 1 except that 100 parts of the onium-containing polyether rubber 7 was used instead of 100 parts of the onium-containing polyether rubber 1. The test specimen 7 was evaluated for volume resistivity value (23° C., 50% RH) or the like. The results are given in the Table 1.

Example 8

Production of Onium-Containing Polyether Rubber 8

A glass reactor equipped with a stirrer was charged with 165 parts of the polyether rubber A and 1089 parts of toluene. By stirring at 50° C. for 12 hours, the polyether rubber A was dissolved. Subsequently, 63 parts of methanol was added thereto and stirred for 15 minutes. The polyether rubber mixture obtained was then added with 59.1 parts of trimethylamine, and after elevating the temperature to 75° C. under stirring, the reaction was carried out at 75° C. for 5 days. After 5 days, the reaction solution was cooled to 20° C. to terminate the reaction. 1 part of the reaction solution was mixed with 5 parts of hexane and stirred for 30 minutes to coagulate the polymer phase. The organic phase in the upper layer was collected and used as a sample to measure the reaction ratio of trimethylamine by GC. As a result, the reaction ratio was found to be 50%. The reaction solution was coagulated by distillation of the solvent in steam, and then dried in vacuo to obtain the onium-containing polyether rubber 8 with yield of 170 parts. Content ratio of an onium ion unit in the onium-containing polyether rubber 8 obtained was 20.01 mol %, the weight average molecular weight was 910,000, and the Mooney viscosity was 84.

Production of Rubber Composition 8 and Cross-Linked Rubber 8

The rubber composition 8 and cross-linked rubber 8 (test specimen 8) were produced in the same manner as the Example 1 except that 100 parts of the onium-containing polyether rubber 8 was used instead of 100 parts of the onium-containing polyether rubber 1. The test specimen 8 was evaluated for volume resistivity value (23° C., 50% RH) or the like. The results are given in the Table 1.

Example 9

Production of Onium-Containing Polyether Rubber 9

A glass reactor equipped with a stirrer was charged with 175 parts of the polyether rubber B and 1167 parts of toluene. By stirring at 50° C. for 12 hours, the polyether rubber B was dissolved. Subsequently, 67 parts of methanol was added thereto and stirred for 15 minutes. The polyether rubber mixture obtained was then added with 43.6 parts of n-butyl dimethyl amine, and after elevating the temperature to 75° C. under stirring, the reaction was carried out at 75° C. for 7 days. After 7 days, the reaction solution was cooled to 20° C. to terminate the reaction. 1 part of the reaction solution was mixed with 5 parts of hexane and stirred for 30 minutes to coagulate the polymer phase. The organic phase in the upper layer was collected and used as a sample to measure the reaction ratio of n-butyl dimethyl amine by GC. As a result, the reaction ratio was found to be 13%. The reaction solution was coagulated by distillation of the solvent in steam, and then dried in vacuo to obtain the onium-containing polyether rubber 9 with yield of 175 parts. Content ratio of an onium ion unit in the onium-containing polyether rubber 9 obtained was 2.01 mol %, the weight average molecular weight was 650,000, and the Mooney viscosity was 41.

Production of Rubber Composition 9 and Cross-Linked Rubber 9

The rubber composition 9 and cross-linked rubber 9 (test specimen 9) were produced in the same manner as the Example 1 except that 100 parts of the onium-containing polyether rubber 9 was used instead of 100 parts of the onium-containing polyether rubber 1. The test specimen 9 was evaluated for volume resistivity value (23° C., 50% RH) or the like. The results are given in the Table 1.

Example 10

Production of Onium-Containing Polyether Rubber 10

A glass reactor equipped with a stirrer was charged with 180 parts of the polyether rubber C and 1204 parts of toluene. By stirring at 50° C. for 12 hours, the polyether rubber C was dissolved. Subsequently, 84 parts of methanol was added thereto and stirred for 15 minutes. The polyether rubber mixture obtained was then added with 51.1 parts of n-butyl dimethyl amine, and after elevating the temperature to 75° C. under stirring, the reaction was carried out at 75° C. for 7 days. After 7 days, the reaction solution was cooled to 20° C. to terminate the reaction. 1 part of the reaction solution was mixed with 5 parts of hexane and stirred for 30 minutes to coagulate the polymer phase. The organic phase in the upper layer was collected and used as a sample to measure the reaction ratio of n-butyl dimethyl amine by GC. As a result, the reaction ratio was found to be 120. The reaction solution was coagulated by distillation of the solvent in steam, and then dried in vacuo to obtain the onium-containing polyether rubber 10 with yield of 181 parts. Content ratio of an onium ion unit in the onium-containing polyether rubber 10 obtained was 2.02 mol %, the weight average molecular weight was 860,000, and the Mooney viscosity was 65.

Production of Rubber Composition 10 and Cross-Linked Rubber 10

The rubber composition 10 and cross-linked rubber 10 (test specimen 10) were produced in the same manner as the Example 1 except that 100 parts of the onium-containing polyether rubber 10 was used instead of 100 parts of the onium-containing polyether rubber 1. The test specimen 10 was evaluated for volume resistivity value (23° C., 50% RH) or the like. The results are given in the Table 1.

Example 11

Production of Onium-Containing Polyether Rubber 11

A glass reactor equipped with a stirrer was charged with 190 parts of the polyether rubber D and 1271 parts of toluene. By stirring at 50° C. for 12 hours, the polyether rubber D was dissolved. Subsequently, 65 parts of methanol was added thereto and stirred for 15 minutes. The polyether rubber mixture obtained was then added with 4.31 parts of n-butyl dimethyl amine, and after elevating the temperature to 75° C. under stirring, the reaction was carried out at 75° C. for 24 hours. After 24 hours, the reaction solution was cooled to 20° C. to terminate the reaction. 1 part of the reaction solution was mixed with 5 parts of hexane and stirred for 30 minutes to coagulate the polymer phase. The organic phase in the upper layer was collected and used as a sample to measure the reaction ratio of n-butyl dimethyl amine by GC. As a result, the reaction ratio was found to be 70%. The reaction solution was coagulated by distillation of the solvent in steam, and then dried in vacuo to obtain the onium-containing polyether rubber 11 with yield of 181 parts. Content ratio of an onium ion unit in the onium-containing polyether rubber 11 obtained was 1.45 mol %, the weight average molecular weight was 650,000, and the Mooney viscosity was 68.

Production of Rubber Composition 11 and Cross-Linked Rubber 11

The rubber composition 11 and cross-linked rubber 11 (test specimen 11) were produced in the same manner as the Example 1 except that 100 parts of the onium-containing polyether rubber 11 was used instead of 100 parts of the onium-containing polyether rubber 1, 3 parts of magnesia (MgO 100, made by Kyowa Chemical Industry Co., Ltd.) was used as an acid acceptor, 1 part of 1,3,5,-triazine trithiol (ZISNET-F, made by Sankyo Kasei Co., Ltd.) was used as a cross-linking agent instead of 0.5 part of sulfur, and no cross-linking accelerator was used. The test specimen 11 was evaluated for volume resistivity value (23° C., 50% RH) or the like. The results are given in the Table 1.

Comparative example 1

Production of Rubber Composition 12 and Cross-Linked Rubber 12

The rubber composition 12 and cross-linked rubber 12 (test specimen 12) were produced in the same manner as the Example 1 except that 100 parts of the polyether rubber A was used instead of 100 parts of the onium-containing polyether rubber 1. The test specimen 12 was evaluated for volume resistivity value (23° C., 50% RH) or the like. The results are given in the Table 1.

Comparative example 2

Production of Rubber Composition 13 and Cross-Linked Rubber 13

The rubber composition 13 and cross-linked rubber 13 (test specimen 13) were produced in the same manner as the Example 1 except that 100 parts of the polyether rubber B was used instead of 100 parts of the onium-containing polyether rubber 1. The test specimen 13 was evaluated for volume resistivity value (23° C., 50% RH) or the like. The results are given in the Table 1.

Comparative Example 3

Production of Rubber Composition 14 and Cross-Linked Rubber 14

The rubber composition 14 and cross-linked rubber 14 (test specimen 14) were produced in the same manner as the Example 1 except that 100 parts of the polyether rubber C was used instead of 100 parts of the onium-containing polyether rubber 1. The test specimen 14 was evaluated for volume resistivity value (23° C., 50% RH) or the like. The results are given in the Table 1.

Comparative Example 4

Production of Rubber Composition 15 and Cross-Linked Rubber 15

The rubber composition 15 and cross-linked rubber 15 (test specimen 15) were produced in the same manner as the Example 11 except that 100 parts of the polyether rubber D was used instead of 100 parts of the onium-containing polyether rubber 11. The test specimen 15 was evaluated for volume resistivity value (23° C., 50% RH) or the like. The results are given in the Table 1.

Comparative Example 5

Production of Onium-Containing Polyether Rubber 12

A glass reactor equipped with a stirrer was charged with 166 parts of the polyether rubber A and 1090 parts of toluene. By stirring at 50° C. for 12 hours, the polyether rubber A was dissolved. Subsequently, 64 parts of methanol was added thereto and stirred for 15 minutes. The polyether rubber mixture obtained was then added with 118.4 parts of trimethylamine, and after elevating the temperature to 75° C. under stirring, the reaction was carried out at 75° C. for 14 days. After 14 days, the reaction solution was cooled to 20° C. to terminate the reaction. 1 part of the reaction solution was mixed with 5 parts of hexane and stirred for 30 minutes to coagulate the polymer phase. The organic phase in the upper layer was collected and used as a sample to measure the reaction ratio of trimethylamine by GC. As a result, the reaction ratio was found to be 41%. The reaction solution was coagulated in hexane, and then dried in vacuo to obtain the onium-containing polyether rubber 12 with yield of 202 parts.

Content ratio of an onium ion unit in the onium-containing polyether rubber 12 obtained was 33.00 mol % and weight average molecular weight was 890,000. The onium-containing polyether rubber 12 was harder than the onium-containing polyether rubber of the Examples 1 to 11 and was not fully plasticized at 100° C., and therefore it was impossible to measure Mooney viscosity.

Production of Rubber Composition and Cross-Linked Rubber

An attempt was made to produce a rubber composition and a cross-linked rubber (test specimen) in the same manner as the Example 1 except that 100 parts of the onium-containing polyether rubber 12 was used instead of 100 parts of the onium-containing polyether rubber 1. However, since the onium-containing polyether rubber 12 is very hard so that it may not be kneaded in a Banbury mixer, kneading in an open roll at 50° C. was tried. However, it was impossible to homogeneously disperse the additives like carbon black and the cross-linking agent. Further, due to the high hardness, it was difficult to process it into a smooth cross-linked sheet. Further, the surface of the sheet has irregularities, and thus volume resistivity value (23° C., 50% RH) or the like could not be measured.

As listed in the Table 1, the cross-linked rubber containing the polyether rubber of the present invention (Examples 1 to 8) exhibited lower volume resistivity value compared to the cross-linked rubber containing non-onium-containing base polyether rubber (Comparative example 1), and suppressed increase in volume resistivity value caused by electric current, and therefore it was proven to be suitable for a conductive member. Similarly, compared to the Comparative examples 2, 3, and 4, each of the Examples 9, 10, and 11 exhibited lower volume resistivity value and suppressed increase in volume resistivity value caused by electric current, and therefore they were also proven to be suitable for a conductive member. The Examples 1 to 10 exhibited a particularly low resistance value. Further, the Examples 1 to 7 and the Examples 9 to 11 exhibited particularly low Mooney viscosity, indicating excellent molding processability. On the other hand, the Comparative example 5 in which the content ratio of a unit substituted with an onium ion-containing group is excessively higher than that of the present invention exhibited that the polyether rubber is rigid, indicating loss of the properties of a rubber elastomer.

The invention claimed is:

1. A cross-linked rubber for conductive member obtained by cross-linking a polyether rubber comprising:
a unit represented by the formula (1) in an amount of 0.5 mol % or more but less than 25 mol % and a cross-linkable monomer unit,

[Chemical Formula 4]

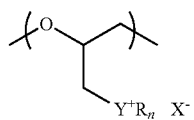

(1)

in the formula, —$Y^-R_n$ represents an ammonium ion, R represents an alkyl group having 1 to 18 carbon atoms, $X^-$ represents arbitrary counter anion, and n is 3.

2. The cross-linked rubber as set forth in claim 1, wherein —$Y^+R_n$ is —$N^+(n-C_4H_9)(CH_3)_2$ or —$N^+(CH_3)_3$.

3. The cross-linked rubber as set forth in claim 1, wherein said cross-linkable monomer unit is an epihalohydrin monomer unit and/or an unsaturated oxide monomer unit.

4. A conductive member comprising the cross-linked rubber as set forth in claim 1.

* * * * *

UNITED STATES PATENT AND TRADEMARK OFFICE
CERTIFICATE OF CORRECTION

PATENT NO. : 9,236,159 B2
APPLICATION NO. : 13/519835
DATED : January 12, 2016
INVENTOR(S) : Hiroyuki Yonemaru et al.

It is certified that error appears in the above-identified patent and that said Letters Patent is hereby corrected as shown below:

IN THE CLAIMS:

In Claim 1, at Column 32, line 7 (in the line immediately below the Chemical Formula), change "in the formula, $-Y^-R_n$" to --in the formula, $-Y^+R_n$--.

Signed and Sealed this
Twenty-fourth Day of May, 2016

Michelle K. Lee
*Director of the United States Patent and Trademark Office*